United States Patent
Rapp

(10) Patent No.: US 9,712,242 B2
(45) Date of Patent: Jul. 18, 2017

(54) OPTICAL NETWORK AND OPTICAL NETWORK ELEMENT

(71) Applicant: Xieon Networks S.a.r.l., Luxembourg (LU)

(72) Inventor: Lutz Rapp, Deisenhofen (DE)

(73) Assignee: Xieon Networks S.a.r.l., Luxemburg (LU)

( * ) Notice: Subject to any disclaimer, the term of this patent is extended or adjusted under 35 U.S.C. 154(b) by 0 days.

(21) Appl. No.: 14/401,622

(22) PCT Filed: Jul. 4, 2013

(86) PCT No.: PCT/EP2013/064135
§ 371 (c)(1),
(2) Date: Nov. 17, 2014

(87) PCT Pub. No.: WO2014/019797
PCT Pub. Date: Feb. 6, 2014

(65) Prior Publication Data
US 2015/0171964 A1    Jun. 18, 2015

(30) Foreign Application Priority Data
Jul. 30, 2012 (EP) .................................. 12178480

(51) Int. Cl.
*H04B 10/27* (2013.01)
*H04J 14/04* (2006.01)
(Continued)

(52) U.S. Cl.
CPC ......... *H04B 10/27* (2013.01); *H04B 10/2581* (2013.01); *H04J 14/00* (2013.01); *H04J 14/04* (2013.01)

(58) Field of Classification Search
CPC ............................ H04B 10/2581; H04B 10/27
(Continued)

(56) References Cited

U.S. PATENT DOCUMENTS 5,798,853 A * 8/1998 Watanabe .......... H04B 10/2531
359/300
2003/0161030 A1* 8/2003 Oh ...................... H01S 3/06758
359/334
(Continued)

FOREIGN PATENT DOCUMENTS

| EP | 2333990 A1 | 6/2011 |
| EP | 2365654 A2 | 9/2011 |
| WO | 2014/019797 A1 | 2/2014 |

OTHER PUBLICATIONS

Krummrich ["Spatial Multiplexing for High Capacity Transport" Optical Fiber Technology, 2011].*
(Continued)

Primary Examiner — Oommen Jacob
(74) Attorney, Agent, or Firm — Nelson Mullins Riley & Scarborough LLP

(57) ABSTRACT

An optical network is suggested, comprising a first set of optical fibers, a multimode multiplexer, a multimode amplifier, a multimode demultiplexer, and a second set of optical fibers, wherein the first set of optical fibers is connected via the multimode multiplexer to the multimode amplifier and wherein the multimode amplifier is connected via the multimode demultiplexer to the second set of optical fibers. Accordingly, an optical network element is provided.

6 Claims, 4 Drawing Sheets

(51) Int. Cl.
*H04B 10/12* (2006.01)
*H04J 14/00* (2006.01)
*H04B 10/2581* (2013.01)

(58) Field of Classification Search
USPC .............................................. 398/58, 43, 44
See application file for complete search history.

(56) References Cited

U.S. PATENT DOCUMENTS

| | | | | |
|---|---|---|---|---|
| 2010/0329671 | A1* | 12/2010 | Essiambre | G02B 6/14 398/44 |
| 2012/0207470 | A1* | 8/2012 | Djordjevic | H04B 10/25 398/44 |
| 2012/0224861 | A1* | 9/2012 | Winzer | G02B 6/14 398/143 |
| 2012/0262780 | A1* | 10/2012 | Bai | H04B 10/2931 359/337.11 |
| 2014/0055843 | A1* | 2/2014 | Roland | H01S 3/06754 359/341.3 |
| 2015/0171964 | A1* | 6/2015 | Rapp | H04J 14/00 398/58 |
| 2015/0188659 | A1* | 7/2015 | Lipson | H04J 14/04 398/44 |

OTHER PUBLICATIONS

Bai, Neng et al., "Experimental Study on Multimode Fiber Amplifier Using Modal Reconfigurable Pump," OFC/NFOEC Technical Digest, 3 pages (2012).

Giles, C.R. et al., "Characterization of Erbium-Doped Fibers and Application to Modeling 980-nm and 1480-nm Pumped Amplifiers," IEEE Photonics Technology Letters, vol. 3(4):363-365 (1991).

Krummrich, Peter M., "Spatial multiplexing for high capacity transport," Optical Fiber Technology, vol. 17:480-489 (2011).

Nykolak, G. et al., "An Erbium-Doped Multimode Optical Fiber Amplifier," IEEE Transactions Photonics Technology Letters, vol. 3(12):1079-1081 (1991).

Riesen, Nicolas et al., "Few-Mode Elliptical-Core Fiber Data Transmission," IEEE Photonics Technology Letters, vol. 24(5):344-346 (2012).

International Search Report and Written Opinion for Application No. PCT/EP2013/064135, 12 pages, dated Oct. 22, 2013.

* cited by examiner

US 9,712,242 B2

OPTICAL NETWORK AND OPTICAL NETWORK ELEMENT

CROSS REFERENCE TO RELATED APPLICATIONS

This application is a U.S. National Phase Application under 35 U.S.C. §371 of International Application No. PCT/EP2013/064135, filed on Jul. 4, 2013, which in turn claims priority to European Patent Application No. 12178480.5, filed on Jul. 30, 2012, both of which are incorporated herein by reference in their entireties.

The invention relates to an optical network and to an optical network element.

The amount of data that has to be transported over long distances is continuously increasing. In the past, wavelength-division multiplexing, modulation formats providing increased spectral density and polarization-diversity have been successfully introduced in order to cope with this demand. Nowadays, enhancing the capacity of optical fibers by making use of mode multiplexing is under discussion.

Using different modes of an optical fiber for data communication leads in particular to the following problems:
(1) So far, making use of already existing fiber plants has been a major restriction for the introduction of new technologies, because such fiber plants cannot be used for utilizing multiple modes. Hence, new fibers need to be installed causing a significant amount of costs.
(2) Current technologies leave problems unsolved regarding, e.g., optical amplifiers that supply amplification to several modes in a simultaneous manner.

As an alternative, the capacity may be increased by using several fibers within the same cable. This option makes use of the fact that modern cables contain up to around 1000 fibers and offers the advantage that these cables have already been deployed.

FIG. 1 shows an exemplary embodiment of several transmission fibers being used separately, i.e. exactly one transmission fiber is connected to the input of an amplifier (e.g., an erbium-doped fiber amplifier) etc. Each transmission fiber amplifier transmission fiber amplifier arrangement is used to convey a single mode only.

FIG. 2 shows a multimode arrangement, comprising a multimode EDFA connected to a multimode transmission fiber and to a next multimode EDFA and a subsequent multimode transmission fiber etc.

Hence, FIG. 1 makes use of parallel single-mode links with separate amplifiers. The same capacity can be achieved with the configuration shown in FIG. 2 by using multi-mode fibers and multi-mode amplifiers. The multimode approach bears the advantage that a reduced number of network elements is required, but on the other hand requires fibers that are capable of handling multimode transmission.

The solution presented herein provides an alternative approach for efficiently conveying information via existing cables comprising several transmission fibers.

This problem is solved according to the features of the independent claims. Further embodiments result from the depending claims.

In order to overcome this problem, an optical network is provided comprising
 a first set of optical fibers,
 a multimode multiplexer,
 a multimode amplifier,
 a multimode demultiplexer, and
 a second set of optical fibers,
 wherein the first set of optical fibers is connected via the multimode multiplexer to the multimode amplifier and
 wherein the multimode amplifier is connected via the multimode demultiplexer to the second set of optical fibers.

Hence, the solution allows using legacy single mode fibers in combination with a multimode amplifier. This saves a significant amount of costs as a huge amount of single mode amplifiers are no longer required. The multimode amplifier may be an erbium-doped fiber amplifier.

In an embodiment, the first set of optical fibers and the second set of optical fibers comprise an identical number of optical fibers.

In another embodiment intended in particular for networks with optical switching functionality, the first set of optical fibers and the second set of optical fibers comprise different numbers of optical fibers.

In another embodiment, the first set of optical fibers and the second set of optical fibers each comprise singlemode optical fibers.

In a further embodiment, a singlemode optical amplifier is deployed between the first set of optical fibers and the multimode multiplexer and/or between the multimode demultiplexer and the second set of optical fibers.

Such additional singlemode amplifier preferably provides a limited (minor) gain and avoids or reduces noise.

In a next embodiment, the optical amplifier comprises at least one pump (in particular a laser source providing the required energy) comprising, e.g., a laser source (e.g., diode), that is coupled to at least one respective optical fiber of the first set of optical fibers or to at least one of the second set of optical fibers.

According to an embodiment, several singlemode optical amplifiers are deployed between the first set of optical fibers and the multimode multiplexer and/or between the multimode demultiplexer and the second set of optical fibers.

Pursuant to an embodiment, the several singlemode optical amplifiers work separately from each other and use separate pumps.

According to yet an embodiment, the several optical amplifiers, in particular a group of optical amplifiers, share(s) a common pump that is used to provide the required power to the different singlemode fibers.

It is in particular a solution that a group of amplifiers share a common pump and another group (at least one amplifier) is supplied by a different pump.

It is also an embodiment that the pump comprises a laser diode that emits light at a wavelength amounting substantially to 980 nm or to 1480 nm.

Pursuant to another embodiment, the pump is coupled to the respective optical fiber via a WDM coupler.

According to an embodiment, the pump is connected to a splitter, which is coupled to each of the optical fibers of the first set of optical fibers or to the second set of optical fibers.

According to another embodiment, an erbium doped fiber is deployed between the first set of optical fibers and the multimode multiplexer and/or between the multimode demultiplexer and the second set of optical fibers.

According to an embodiment, the singlemode optical amplifier comprises means to enable scattering effects, in particular stimulated Raman scattering or stimulated Brillouin scattering.

Hence, the amplification in the singlemode branches can be achieved by scattering effects such as stimulated Raman scattering or stimulated Brillouin scattering.

In a next embodiment, the singlemode optical amplifier provides parametric amplification.

In a further embodiment, the singlemode optical amplifier comprises a fiber doped with a rare earth element, in particular erbium.

Hence, a part of the singlemode branch is doped with a rare earth element, such as erbium, in order to provide amplification.

In yet another embodiment, the singlemode optical amplifier is implemented in the multimode multiplexer and/or in the multimode demultiplexer.

The problem stated above is also solved by an optical network element comprising
a multimode multiplexer,
a multimode amplifier,
a multimode demultiplexer,
wherein a first set of optical fibers is connected via the multimode multiplexer to the multimode amplifier and
wherein the multimode amplifier is connected via the multimode demultiplexer to a second set of optical fibers.

The embodiments described above with regard to the network apply to the network element accordingly.

Embodiments of the invention are shown and illustrated in the following figures:

DETAILED DESCRIPTION

It is assumed that a multimode amplifier exists that allows for simultaneous amplification of several modes (see, e.g., Y. Yung, et al.: First demonstration of multimode amplifier for spatial division multiplexed transmission systems, ECOC 2011, 978-1-55752-932-911).

Figure 1:
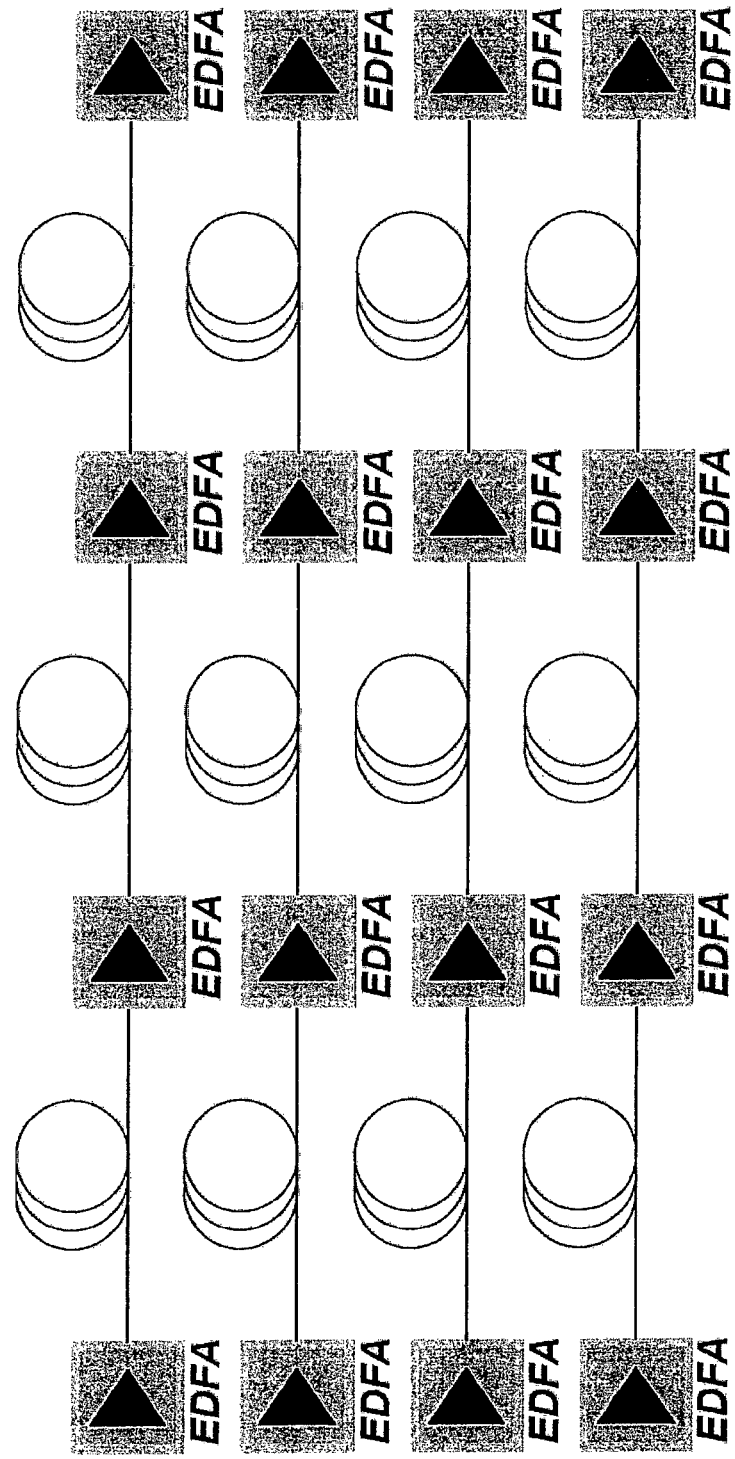
FIG. 1 shows an exemplary embodiment of several transmission fibers being used separately.
Figure 2:
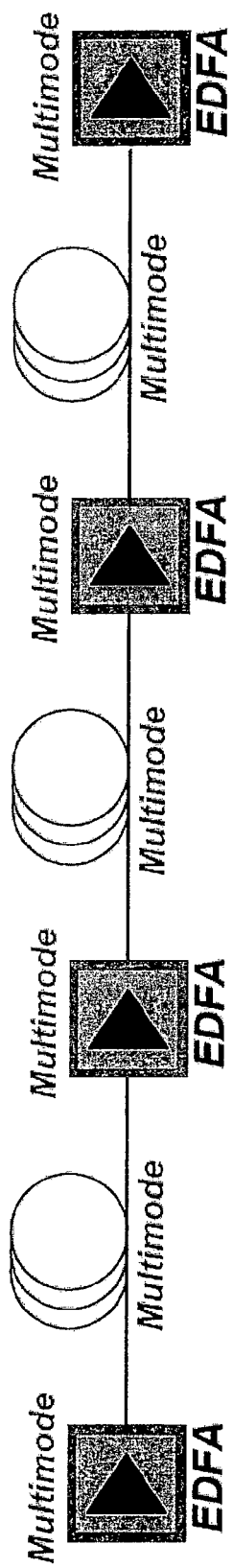
FIG. 2 shows a multicode arrangment.
Figure 3:
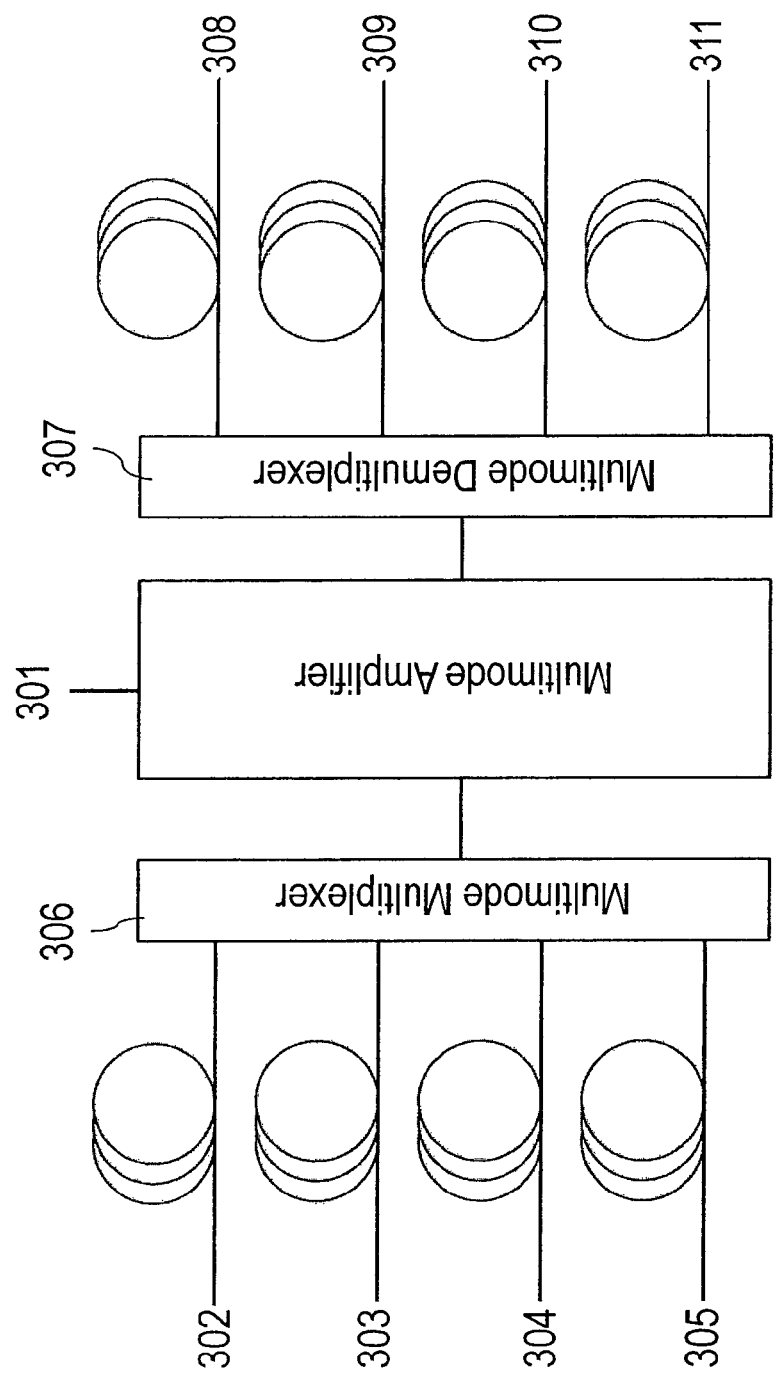
FIG. 3 shows an exemplary scenario with a multimode amplifier.

FIG. 3 shows an exemplary scenario with a multimode amplifier 301 (e.g., an erbium-doped fiber amplifier, EDFA). Transmission fibers 302 to 305 are connected to a multimode multiplexer 306, which provides a combined signal fed to said multimode amplifier 301. This multimode amplifier 301 conveys its output via a multimode demultiplexer 307 to several transmission fibers 308 to 311. The transmission fibers 302 to 305 and 308 to 311 may be singlemode transmission fibers.

Advantageously, this approach allows using existing fibers and combines them with a (preferably low cost) multimode amplifier.

Figure 4:
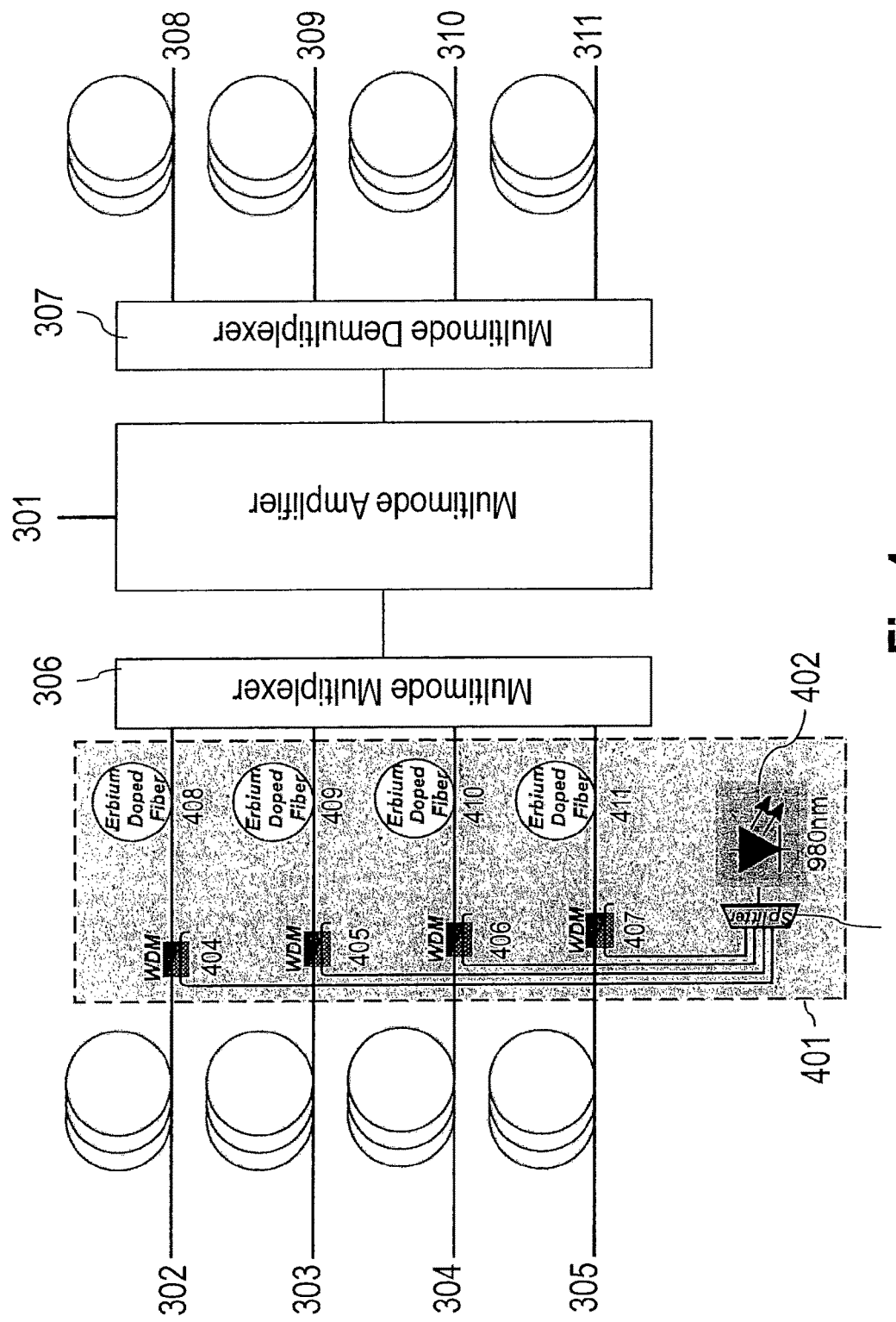
FIG. 4 shows based on FIG. 3 an embodiment that allows reducing additional noise by supplying a low-cost singlemode amplifier sharing a common pump and providing only a small gain.

FIG. 4 shows based on FIG. 3 an embodiment that allows reducing additional noise by supplying a low-cost singlemode amplifier 401 sharing a common pump 402 and providing only a small gain: The pump 402 could be realized as a laser diode emitting light at a frequency amounting to 980 nm (or 1480 nm). The pump 402 is connected to a splitter 403 that supplies light via a WDM-coupler 404 to 407 to each of the transmission fibers 302 to 305, which is further connected via an erbium doped fiber 408 to 411 to the multimode multiplexer 306.

As an alternative, amplifiers could be integrated into the multiplexing and demultiplexing units.

LIST OF ABBREVIATIONS

EDFA erbium-doped fiber amplifier
WDM wavelength-division multiplexing

The invention claimed is:
1. An optical network, comprising:
a first set of optical fibers,
a multimode multiplexer,
a multimode amplifier,
a multimode demultiplexer, and
a second set of optical fibers,
wherein the first set of optical fibers is connected via the multimode multiplexer to the multimode amplifier,
wherein the multimode amplifier is connected via the multimode demultiplexer to the second set of optical fibers,
wherein a singlemode optical amplifier is deployed between the first set of optical fibers and the multimode multiplexer and/or between the multimode demultiplexer and the second set of optical fibers,
wherein several singlemode optical amplifiers are deployed between the first set of optical fibers and the multimode multiplexer and/or between the multimode demultiplexer and the second set of optical fibers, and
wherein the several optical amplifiers, in particular a group of optical amplifiers, share a common pump that is used to provide the required power to the different singlemode fibers.

2. An optical network, comprising:
a first set of optical fibers,
a multimode multiplexer,
a multimode amplifier,
a multimode demultiplexer, and
a second set of optical fibers,
wherein the first set of optical fibers is connected via the multimode multiplexer to the multimode amplifier,
wherein the multimode amplifier is connected via the multimode demultiplexer to the second set of optical fibers,
wherein a singlemode optical amplifier is deployed between the first set of optical fibers and the multimode multiplexer and/or between the multimode demultiplexer and the second set of optical fibers,
wherein the singlemode optical amplifier comprises at least one pump that is coupled to at least one respective optical fiber of the first set of optical fibers or to at least one of the second set of optical fibers, and
wherein the pump is connected to a splitter, which is coupled to each of the optical fibers of the first set of optical fibers or to the second set of optical fibers.

3. An optical network element comprising
a multimode multiplexer,
a multimode amplifier,
a multimode demultiplexer,
wherein a first set of optical singlemode transmission fibers is connected via the multimode multiplexer to the multimode amplifier,
wherein the multimode amplifier is connected via the multimode demultiplexer to a second set of singlemode transmission optical fibers,
wherein the first and second sets of singlemode transmission fibers are configured for transmitting data over long distances, wherein a singlemode optical amplifier is deployed between the first set of optical fibers and the multimode multiplexer and/or between the multimode demultiplexer and the second set of optical fibers, wherein several singlemode optical amplifiers are deployed between the first set of optical fibers and the multimode multiplexer and/or between the multimode demultiplexer and the second set of optical fibers, and wherein the several optical amplifiers, in particular a group of optical amplifiers, share a common pump that is used to provide the required power to the different singlemode fibers.

4. An optical network element comprising
a multimode multiplexer,
a multimode amplifier,
a multimode demultiplexer,
wherein a first set of optical singlemode transmission fibers is connected via the multimode multiplexer to the multimode amplifier,
wherein the multimode amplifier is connected via the multimode demultiplexer to a second set of singlemode transmission optical fibers,
wherein the first and second sets of singlemode transmission fibers are configured for transmitting data over long distances,
wherein a singlemode optical amplifier is deployed between the first set of optical fibers and the multimode multiplexer and/or between the multimode demultiplexer and the second set of optical fibers,
wherein the singlemode optical amplifier comprises at least one pump that is coupled to at least one respective optical fiber of the first set of optical fibers or to at least one of the second set of optical fibers, and
wherein the pump is connected to a splitter, which is coupled to each of the optical fibers of the first set of optical fibers or to the second set of optical fibers.

5. An optical network element comprising
a multimode multiplexer,
a multimode amplifier,
a multimode demultiplexer,
wherein a first set of optical fibers is connected via the multimode multiplexer to the multimode amplifier and
wherein the multimode amplifier is connected via the multimode demultiplexer to a second set of optical fibers,
wherein a singlemode optical amplifier is deployed between the first set of optical fibers and the multimode multiplexer and/or between the multimode demultiplexer and the second set of optical fibers,
wherein several singlemode optical amplifiers are deployed between the first set of optical fibers and the multimode multiplexer and/or between the multimode demultiplexer and the second set of optical fibers, and
wherein the several optical amplifiers, in particular a group of optical amplifiers, share a common pump that is used to provide the required power to the different singlemode fibers.

6. An optical network element comprising
a multimode multiplexer,
a multimode amplifier,
a multimode demultiplexer,
wherein a first set of optical fibers is connected via the multimode multiplexer to the multimode amplifier and
wherein the multimode amplifier is connected via the multimode demultiplexer to a second set of optical fibers,
wherein a singlemode optical amplifier is deployed between the first set of optical fibers and the multimode multiplexer and/or between the multimode demultiplexer and the second set of optical fibers,
wherein the singlemode optical amplifier comprises at least one pump that is coupled to at least one respective optical fiber of the first set of optical fibers or to at least one of the second set of optical fibers, and
wherein the pump is connected to a splitter, which is coupled to each of the optical fibers of the first set of optical fibers or to the second set of optical fibers.

\* \* \* \* \*